C. A. & O. S. NORDSTROM.
AUTOMATIC TRUCK.
APPLICATION FILED JAN. 5, 1911.
1,005,063.
Patented Oct. 3, 1911.
2 SHEETS—SHEET 1.
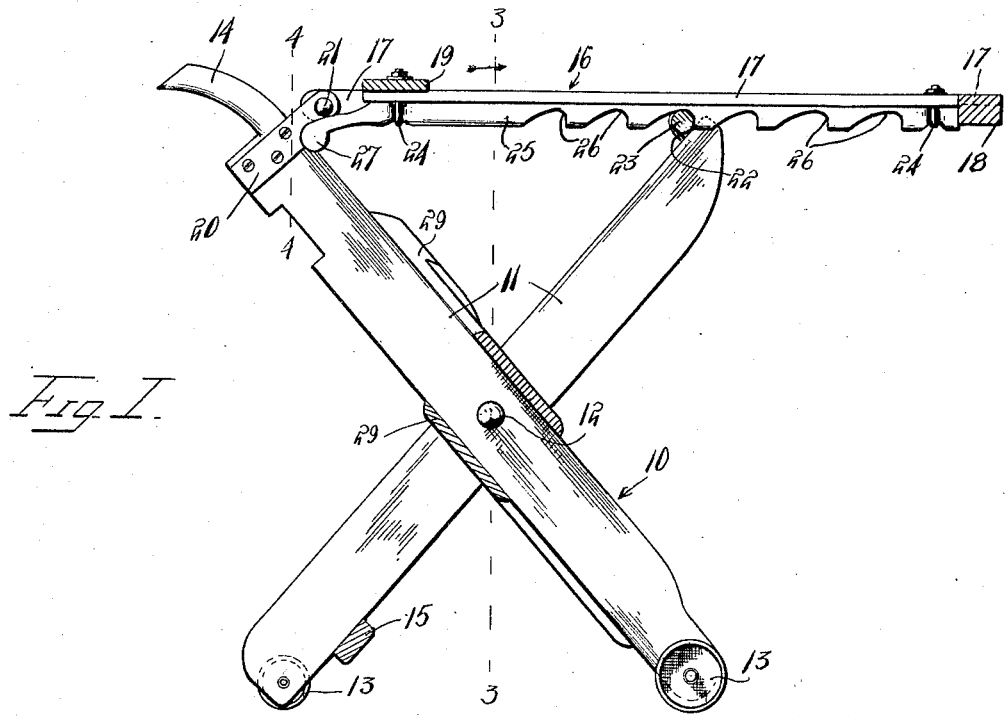
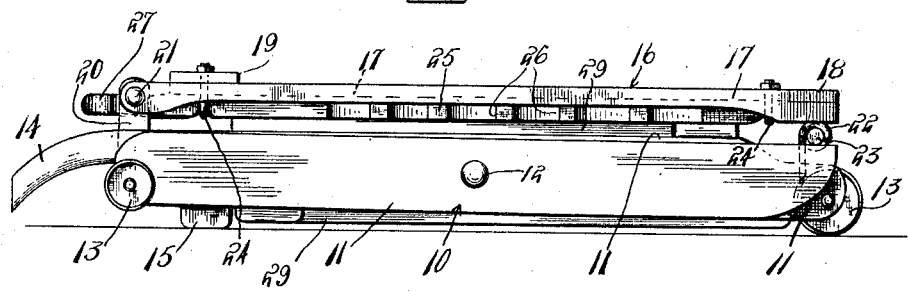

C. A. & O. S. NORDSTROM.
AUTOMATIC TRUCK.
APPLICATION FILED JAN. 5, 1911.

1,005,063.

Patented Oct. 3, 1911.

2 SHEETS—SHEET 2.

Witnesses
J. C. Simpson
Francis Boyle

Inventors
C. A. Nordstrom
O. S. Nordstrom
By
Attorneys

UNITED STATES PATENT OFFICE.

CHARLES A. NORDSTROM AND OTTO S. NORDSTROM, OF FAIRBURN, SOUTH DAKOTA.

AUTOMATIC TRUCK.

1,005,063.     Specification of Letters Patent.     Patented Oct. 3, 1911.

Application filed January 5, 1911. Serial No. 600,932.

*To all whom it may concern:*

Be it known that we, CHARLES A. NORDSTROM and OTTO S. NORDSTROM, citizens of the United States, residing at Fairburn, in the county of Custer, State of South Dakota, have invented certain new and useful Improvements in Automatic Trucks; and we do hereby declare the following to be a full, clear, and exact description of the invention, such as will enable others skilled in the art to which it appertains to make and use the same.

This invention relates to elevating trucks of that general class employing pivoted legs of lazy tongs structure, for elevating the platform of the truck to the level of a car door or the like.

The present invention provides a truck of this character having means whereby the operator can simultaneously anchor the device to a platform and raise vertically the platform of the truck.

A further object of the invention is to provide a truck of this character having a novel means for locking the platform and legs of the truck against movement, so that the parts of the truck will automatically lock when the article carried thereupon is elevated to the desired height.

A still further object is to provide a truck in which the locking means may be quickly and positively released from the handle end of the truck so that the operator without moving from his position between the handles may conveniently effect the collapse of the truck.

With the above objects in view the invention consists in the novel details of construction and combinations of parts hereinafter fully described and claimed, it being understood that various modifications may be made in the minor details of construction within the scope of the appended claims.

Figure 3:
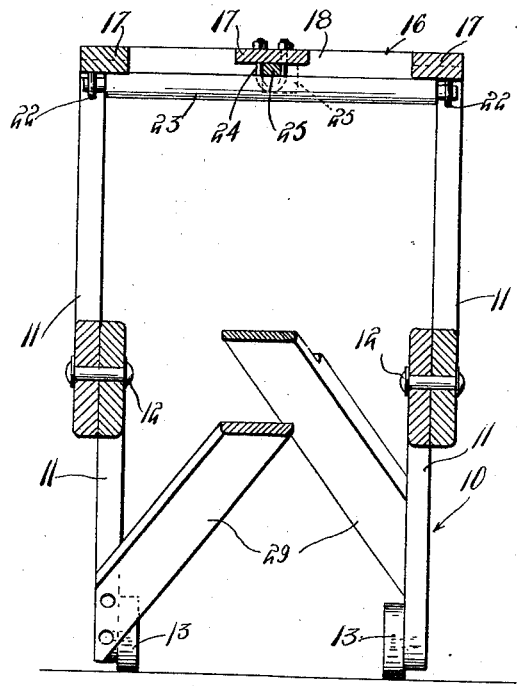
Figure 4:
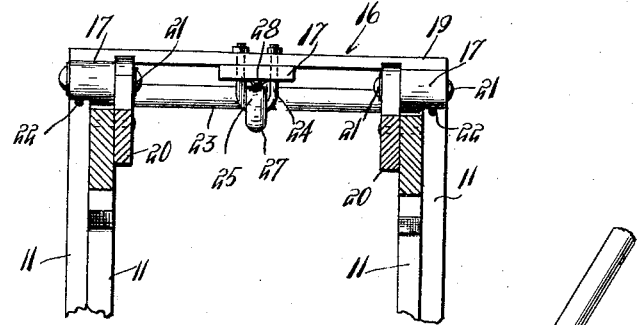
Figure 5:
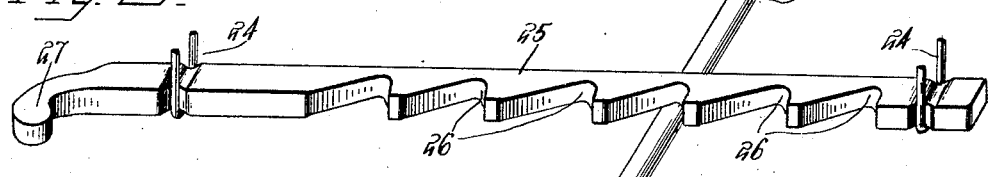

In the accompanying drawings forming part of this specification, Figure 1 is a longitudinal sectional view of the truck, Fig. 2 is a side elevation of the truck in collapsed position, Fig. 3 is a cross sectional view taken on the line 3—3 Fig 1, showing the locking means in full lines in operative position and in dotted lines in released position, Fig. 4 is a cross sectional view taken on the line 4—4 Fig. 1, Fig. 5 is a detail perspective view of the locking device in released position.

Referring now to the drawing in which like characters of reference designate similar parts, the truck is seen to comprise legs of lazy tongs structure designated in general by the numeral 10, and formed of two pairs of centrally crossed bars 11, each pair of bars being pivotally connected together at their intersection by a pivot pin 12. Those ends of the bars designed to confront the floor when the legs are moved in the nature of extending a lazy tongs, are equipped with ground wheels 13. Grips or handles 14 are formed on one bar of each pair of crossed bars, remote from the ground wheels thereof, and further a cross brace 15 connects the remaining bars of each pair of crossed bars, this brace forming an abutment for the operator's foot to bear downwardly upon while the operator is elevating the handles in order to extend the lazy tongs legs and elevate the hereinafter described platform of the truck. This feature is of importance in that in addition to permitting of the operator elevating the truck in a minimum time, the operator further by bearing downward with his foot upon the cross brace 15 positively anchors the truck legs to the floor without the use of floor penetrating spurs or similar devices.

The truck platform 16 is oblong in contour and is preferably formed skeleton in structure, and as illustrated comprises longitudinal slats 17 the forward ends of which are tongued and fitted into rabbets formed in a cross sill 18, and the rear ends of which are connected by a rear cross sill 19 disposed upon the top faces of the slats. A pair of short links 20 are fixed to the legs adjacent the handles 14 thereof and extend at approximately right angles to the legs, and the upper ends of these links are pivotally connected to the inner edges of the outermost slats of the platform by pivot bolts or similar connectors 21. The platform is thus pivotally secured at its rear end to the lazy tongs legs, and as the legs are collapsed or elevated, constantly is maintained in horizontal position by virtue of the forward portions of the outermost longitudinal slats having connection with the legs through the instrumentality of staples 22 which are fixed in the upper edges of the bars 10 of the legs that underlie the leading portions of the truck platform, the outermost longitudinal slats of the platform sliding freely upon these staples as the lazy tongs legs are elevated or collapsed.

For automatically locking the platform and legs against movement when the platform has reached any desired height, a rod 23 has its opposite ends fixed in the staples 22, this rod performs the dual function of a cross brace and a dog as will presently appear. A pair of U-bolts 24 are engaged through one of the longitudinal slats, the bights of the bolts being disposed below the bottom face of the slat. A bar 25 of rectangular cross section is provided on one edge with notches 26 and this bar is engaged through the bights of the U-bolts, with the notches opening downwardly and engaging the rod 23 when the bar is in a certain position. The rear end of the bar is considerably elongated and formed with a handle 27 by means of which the bar may be rotated so as to disengage the bar from the rod 23.

A downwardly bowed leaf spring 28 is fixed transversely of the bottom face of the slat overlying the bar 25 and this spring bears against the top face of the bar and maintains the bar in engagement with the rod or free for engagement with the rod, the spring yielding sufficiently to permit of rotation of the rod.

In operation to elevate the truck from the position shown in Fig. 2 to the position shown in Fig. 1, the operator bears downward upon the cross braces 15 with his foot, and raises vertically upward the handles 14, the legs extending during this operation in the nature of lazy tongs while at the same time the platform is raised vertically and is maintained horizontal. Before the elevating operation, the locking bar 25 is turned so that its notches confront the rod or dog 23, and during the elevating operation the dog slides rearwardly along the bar, and goes to rest in one of the notches of the bar when the elevating movement ceases. When in this final position, the dog locks the platform against further movement upon the legs, and the platform by thus being locked at both end portions to the legs prevents collapsing movement of the legs. When the trunk or other article carried upon the platform has been removed, the operator rotates the locking bar against the pressure of its spring until the bar disengages from the dog, and in this position of the parts, the platform is freed at its forward end from connection with the lazy tongs legs so that the operator may now gradually lower the handles, the legs collapsing during this lowering movement until the truck assumes the position shown in Fig. 2.

In order that the weight of the platform will be taken off from the hinge links 20 and staples 22 when the truck is in collapsed position, a pair of diagonal braces 29 are fixed at their opposite ends to the innermost bars of each pair of braces forming the lazy tongs legs, one of the braces underlying and engaging with the platform when the latter is in collapsed position as clearly shown in Fig. 2.

What is claimed, is:

1. A truck including legs of lazy tongs structure, a platform pivotally connected at one end to said legs and lying constantly in an approximately horizontal plane as the legs are moved to extended and collapsed positions, a revoluble notched locking bar extending longitudinally of said platform, a bar like dog carried by said legs, and engageable with the notches in said bar for locking the platform and legs in stationary position, and means for holding said locking bar against movement.

2. A truck including legs of lazy tongs structure, said legs including two pairs of centrally pivoted cross bars, one bar of each pair being equipped with a handle, a cross brace connecting the other bars of each pair, said cross brace underlying the handles and forming an abutment against which the operator's foot may be placed while moving upwardly said handles to extend said legs, a platform pivoted at one end to said legs adjacent to said handles, and lying at all times in an approximately horizontal plane during movement of said legs to extended and collapsed position, a revoluble locking bar carried by said platform, a bar like dog carried by said legs and engageable with said locking bar for locking said platform and legs in fixed position, and a tension means operatively connected to said locking bar and normally holding said bar against movement.

In testimony whereof, we affix our signatures in presence of two witnesses.

CHARLES A. NORDSTROM.
OTTO S. NORDSTROM.

Witnesses:
J. W. STARBUCK,
G. W. PRATHER.

Copies of this patent may be obtained for five cents each, by addressing the "Commissioner of Patents, Washington, D. C."